United States Patent [19]

Kolb

[11] Patent Number: 4,969,437
[45] Date of Patent: Nov. 13, 1990

[54] ADJUSTING DEVICE FOR A CONTROL ELEMENT, ESPECIALLY FOR THE THROTTLE FLAP OF AN INTERNAL COMBUSTION ENGINE

[75] Inventor: Hartmut Kolb, Ludwigsburg, Fed. Rep. of Germany

[73] Assignee: Daimler-Benz AG, Fed. Rep. of Germany

[21] Appl. No.: 378,697

[22] Filed: Jul. 12, 1989

[30] Foreign Application Priority Data

Jul. 23, 1988 [DE] Fed. Rep. of Germany ....... 3825075

[51] Int. Cl.⁵ .............................................. F02D 11/10
[52] U.S. Cl. .................................... 123/399; 123/340; 180/197
[58] Field of Search ............. 123/340, 342, 352, 361, 123/396, 399; 180/178, 179, 197; 74/513

[56] References Cited

U.S. PATENT DOCUMENTS

| | | | |
|---|---|---|---|
| 4,702,208 | 10/1987 | Lombard et al. | 123/361 X |
| 4,809,656 | 3/1989 | Suzuki | 123/399 X |
| 4,867,122 | 9/1989 | Kono et al. | 123/396 |

FOREIGN PATENT DOCUMENTS 3628456 3/1988 Fed. Rep. of Germany .

Primary Examiner—Tony M. Argenbright
Attorney, Agent, or Firm—Evenson, Wands, Edwards, Lenahan & McKeown

[57] ABSTRACT

In an adjusting device for a throttle flap of an internal combustion engine driving a motor vehicle, wherein further influencing and correcting variables can be introduced via an electric servo-motor into the mechanical transmission device connecting the accelerator pedal and the throttle flap. For this purpose a planetary gear of a transmission device has a rotatable outer gear wheel connected to the accelerator pedal, a sun gear wheel connected to the servo-motor and the planet carrier connected to the throttle flap.

20 Claims, 2 Drawing Sheets

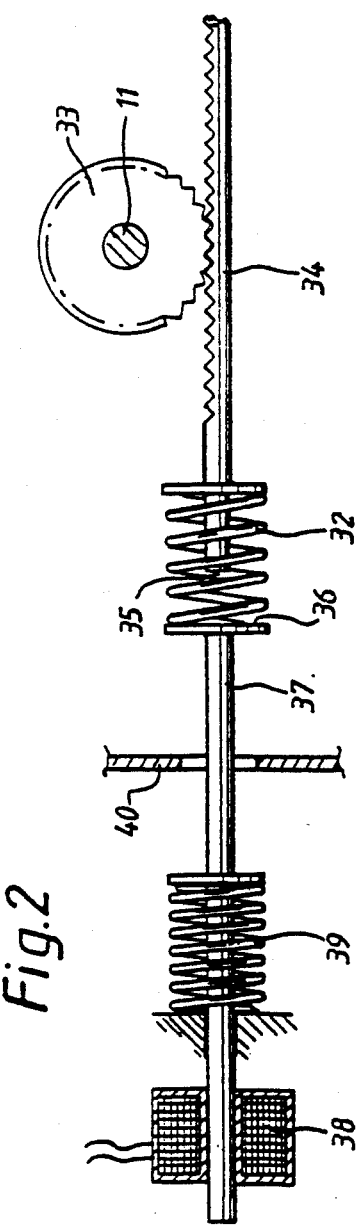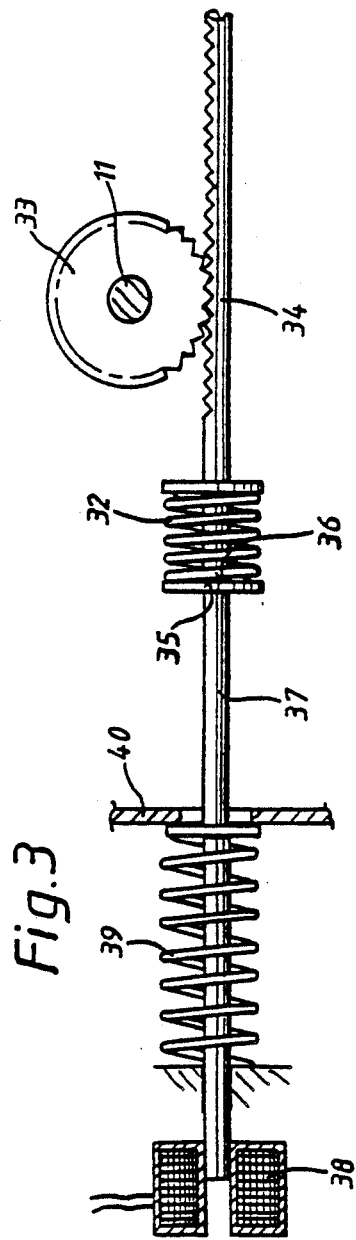

ADJUSTING DEVICE FOR A CONTROL ELEMENT, ESPECIALLY FOR THE THROTTLE FLAP OF AN INTERNAL COMBUSTION ENGINE

BACKGROUND AND SUMMARY OF THE INVENTION

The invention relates to an adjusting device for the throttle flap of an internal combustion engine of a motor vehicle utilizing a mechanical transmission device between an actuating lever and the throttle flap for transmitting movement of the actuating lever to the throttle flap. Also included is a mechanism for introducing other influencing and correcting variables into the transmission device, independently of the movement of the actuating lever, via a servo-motor adjustable as a function of these influencing and correcting variables and a gear wheel acting on the transmission device.

An adjusting device of this general type is known from DE OS 3,628,456 wherein there is a mechanical transmission device with a deflectable flexible part, such as a toothed belt or the core of a Bowden pull, guided via a wheel which is supported displaceably by means of a motor or an electromagnet. A basic shift of the control element by means of an actuating lever can thus have a correcting movement superimposed on it. This movement occurs as a function of other influencing variables, such as drive slip and engine drag torque. In this adjusting device, it is necessary to use a deflectable flexible part which is exposed to special loads at the deflection on the wheel and exerts a load on the wheel support with its entire pull. When the deflectable part is guided to and from the wheel in a non-parallel way, there is no constant transmission ratio between the wheel displacement and the lengthening or shortening of the transmission device.

The object on which the invention is based is to design an adjusting device of this general type mentioned in the introduction, in such a way, that the introduction of the other influencing and correcting variables takes place without the use of a deflectable flexible part. This allows for a greater freedom in the choice of the transmission device.

In an adjusting device of the particular general type, the object is achieved by having a planetary gear inserted in the transmission device. The planetary gear has an outer gear wheel, a sun gear wheel, and a planet carrier carrying planet gear wheels, wherein these elements are respectively connected operativelY to the actuating lever, to the servo-motor and to the throttle flap.

In this adjusting device the introduction of the basic movement, correcting movement and the transfer of the shifting movement to the control element take place as a result of purely rotary movements. With the advantageous use of the servo-motor, there is no need for: a longitudinally displaceable transmission means between the electric servo motor and the planetary gear, or for a flexible pliable part in the transmission device. The transmission ratios between the individual elements of the compact planetary gear are always independent of the position of these elements.

Having the outer gear wheel connected to the actuating lever, the sun gear wheel to the servo-motor, and the planet-gear carrier to the throttle flap, all allows for a favorable spatial design of the planetary gear and of its connections. This also allows for an advantageous reduction ratio between the servo-motor and control element.

The influencing and correcting variables acting on the servo-motor are: the slip of the vehicle gear wheels, the driving speed or transmission ratio between the shifts of the actuating lever and of the throttle flap. Also the selected gear of a vehicle transmission can be an input superimposed on the basic shifts introduced by the actuating lever. In particular, the transmission ratio between the actuating lever and the control element can be varied as a result of a superimposed rotary movement of the servo-motor and of the element connected to it in the planetary gear mechanism. Specifically, during a rotary movement of the servo-motor which is constant in relation to the rotary movement of the element connected to the actuating lever, a constant variation in the transmission ratio is obtained and, with a non-constant rotary movement of the servo-motor, a non-constant transmission ratio is obtained. Thus, degressive, constant, or progressive transmission ratios between the actuating lever and control element can be put into effect as a function of the gears selected. The particular correcting variables can be determined in a known way by means of fields of characteristics.

By having the positions of the actuating lever, servo-motor and throttle flap each determined by an actual-value transmitter, and by having the sum of the position values of the actuating lever and servo-motor compared with the position value of the throttle flap in a computing unit, allows any fault in the mechanical transmission device to be detected. This is possible since the position of the control element depends unmistakenly on the sum of the positions of the actuating lever and servo-motor. This fact can he utilized in the event of a fault in the mechanical transmission device between the actuating lever and that element of the planetary gear connected to it. That element is brought, as a result of restoring spring, into an end position corresponding to the idling position and is retained there. The position value determined by the actual-value transmitter of the actuating lever is transmitted to the servo-motor and the latter is adjusted according to this position value in addition to the other influencing and correcting variables. This makes it possible for the transmission of the position of the actuating lever to be taken over by the servo-motor.

In contrast, in the adjusting device of the general aforementioned type, both the basic and the correcting shift are no longer possible in the event of a fault in the transmission device, for example a break of the flexible pliant part.

In the event of a fault in the electrical device supplying the servo-motor, the adjusting device of the sun gear wheel of the planetarY gear (connected to the servo-motor) is brought into an intermediate position and retained there as a result of spring force from a tension spring. This allows an unchanged complete basic movement by means of the actuating lever, without the possibility of correcting movements, since, in the indicated intermediate position of the servo-motor, the actuating lever and the control element assume suitable positions.

By having the servo-motor shifted into the intermediate position by means of a rack which, when the servo-motor is currentless, is shifted up against an adjustable stop as a result of the spring force of tension spring and wherein an adjustable stop is formed by a stop rod which is retained in one end position by means of a magnet and where the magnet becomes currentless at the same time as the servo-motor, the stop is shifted in the direction of the rack into a second end position as a result of spring force of compression spring. Also the rack then engages on the sun gear wheel shaft. These provide an advantageous organization of elements, which allow the servo-motor and the associated element of the planetary gear to be shifted and retained in an intermediate position Thus, the stop rod, retracted under fault-free circumstances and forming the adjustable stop, allows an unimpeded movement of the rack in both directions. The springs, activated in the event of a fault without any outlay in control terms, ensure the necessary shifting and retention of the servo-motor in a simple way.

It is advantageous if that element of the planetary gear connected to the throttle flap, is fixedly connected in terms of rotation to a drive gear wheel and the shaft of the throttle flap is connected to a driven gear wheel that is driven by an endless flexible drive, or the driven gear wheel. This allows for a simple and reliable direct connection between these parts in less space. This connection by means of rotary parts is also advantageous because the parts to be connected execute rotary movements.

Other objects, advantages and novel features of the present invention will become apparent from the following detailed description of the invention when considered in conjunction with the accompanying drawings.

BRIEF DESCRIPTION OF THE DRAWINGS

FIGS. 2 and 3 show an emergency-running device for the adjusting device in different positions during normal operation and in the event of failure.

DETAILED DESCRIPTION OF DRAWINGS

Figure 1:
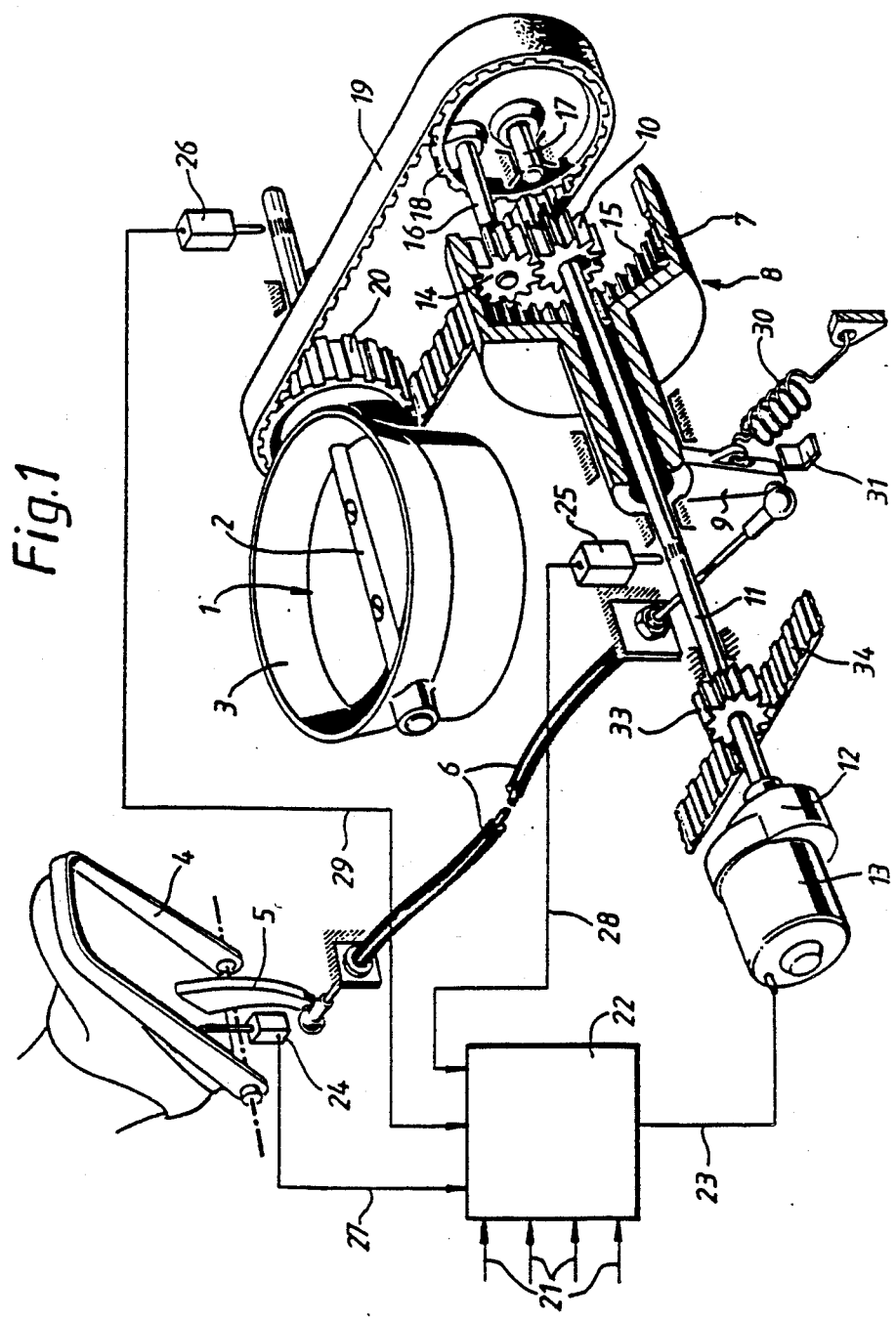
FIG. 1 shows an oblique view of an adjusting device for a control element of an internal-combustion engine.

The control element illustrated in FIG. 1 is a throttle flap 1 of an internal combustion engine which in mounted by means of a shaft 2 in an air intake channel 3 of the internal combustion engine. The basic movement of the throttle flap 1 is introduced by the vehicle driver via an actuating lever 4, the rotation of which is transmitted via a lever 5 to a Bowden cable 6. This cable 6 engages a lever 9 connected to an outer gear wheel 7 of a planetary gear 8. Furthermore, the planetary gear 8 comprises a sun gear wheel 10 which is adjustable via the sun-gear wheel shaft 11 a reduction gear 12 and by a servo-motor 13. The planetary gear also has one or more planet gear wheels 14 which can roll on the sun gear wheel 10 and the internal toothing 15 of the outer gear wheel 7. The planet gear wheel shafts are mounted as planet carriers 16 in a drive gear wheel 18 which is mounted in line with the sun gear wheel shaft 11 on shaft 17 and which, via a toothed belt 19, drives a gear wheel 20 connected fixedly to the shaft 2 of the throttle flap 1. The basic movement of the throttle flap 1 thus takes place purely mechanically as a direct function of the shift of the actuating lever in normal operation and, when the sun gear wheel 10 is stationary.

In addition to this basic movement of the throttle flap 1, there can be a correcting movement which is dependent on correcting and other influencing variables 21 entered in a computing unit 22 and processed therein. The servo-motor 13 is controlled by this computing unit as indicated by the line 23 and this correspondingly rotates the sun gear wheel 10 to cause the planet gear wheels 14 to rotate and walk about the outer gear wheel 7 when it is stationary to change the position of the throttle flap 1. This correcting shift takes place completely independently of the basic movement of the operator. If the two movements are carried out simultaneously, they are superimposed independently of one another, and the movement of the throttle flap 1 is obtained as the sum of the movements of the actuating lever 4 and of the servo-motor 13, with allowance for the ratios occurring along the transmission paths.

The influencing variables entered in the computing unit 22 can be, for example, the gear wheel-slip values or speed control variables of the motor vehicle. However, it is also possible to use correcting variables stored in fields of characteristics and generating correcting movements of the servo-motor 13 which are superimposed on the basic movement in such a way that continuous ratio variations occur between the actuating lever 4 and the throttle flap 1. Thus, for example, progressive and regressive ratios can be obtained as a function of the selected gear of the vehicle transmission.

The fact that the movement of the throttle flap shaft 2 is directly dependent on the sum of the shifts of the actuating lever 4 and of the servo-motor 13 is utilized for monitoring the adjusting device. This is obtained by detecting the shifting travels of the actuating lever 4, of the sun gear wheel shaft 11 and of the throttle flap shaft 2 by means of three actual-value transmitters 24, 25, 26 and transferring them to the computing unit 22 via lines 27, 28, 29. The computing unit compares the values and indicates an inadmissible deviation by means of a signal. By means of these measurements, specific mechanical faults can also he compensated automatically. For example, an elongation of the Bowden pull 6 can be compensated by means of an additional correcting movement of the servo-motor 13. In the event of a break of the mechanical connection between the actuating lever 4 and the outer gear wheel 7, a restoring spring 30, what is fastened to the lever 9, pulls the latter into the idling position up against a stop 31 and retains it, and therefore the outer gear wheel 7, in this position. The movement of the actuating lever 4 is detected by the actual-value transmitter 24 and is transmitted as an additional correcting variable, via the computing unit 22 to the servo-motor 13, so that the latter can move the throttle flap 1 according to the actuation of the actuating lever 4. The other influencing and correcting variables can continue to be taken into account. In these circumstances of a fault, the adjusting device works in a similar way to a so-called E-gas system.

In the event of a fault in the electrical or electronic part of the adjusting device, the servo-motor 13 is made currentless and, as described below, the sun gear wheel 10 is brought into and retained in an intermediate position, in which the basic movements of the actuating lever 4 are transmitted to the throttle flap 1, without a correcting value being superimposed. Even in these circumstances of a fault, movement of the throttle flap 1 over its entire shifting travel is therefore possible, albeit without a correction by the other influencing and correcting variables.

The rotation and retention of the sun gear wheel 10 take place by means of a tension spring 32 (FIG. 2) which is prestressed under fault-free circumstances and which engages a rack 34 meshed with a gear wheel 33, and thus is connected fixedly in terms of rotation to the sun gear wheel shaft 11. Under fault-free circumstances, the rack 34 can move freely on both sides, and it is dragged along, together with the gear wheel 33, by the sun gear wheel shaft 11. In the event of a fault (FIG. 3) due to currentless servo-motor 13, the tension spring 32 pulls one end 35 of the rack 34 up against an adjustable stop 36 of a stop rod 37. In fault-free circumstances, this is retained in one end position by a live magnet 38 counter to the force of a compression spring 39, whereas in the event of a fault, with the magnet 38 becoming currentless at the same time as the servo-motor 13, it is brough into a second end position up against a fixed stop 40 by the compression spring 39. Here its stop 36 thus approaches the rack 34. The position of the rack 34 and therefore of the sun gear wheel 10 is consequently exactly fixed in the event of a fault, while in fault-free circumstances their movements are not impeded by the retracted stop rod 37.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Adjusting device for a throttle flap of an internal combustion engine of a motor vehicle, including:
   a mechanical transmission means between an actuating lever and the throttle flap for transmitting movement of the actuating lever to the throttle flap and a connecting means for introducing other influencing and correcting variables into the transmission means independently of the movement of the actuating lever;
   said connecting means including a servo-motor adjustable as a function of these influencing and correcting variables;
   said servo-motor moving a sun gear wheel of the transmission means;
   the transmission means including a planetary gear having three rotatable elements, namely an outer gear wheel, said sun gear wheel and planet carrier carrying planet gear wheels; and
   wherein the outer gear wheel, the sun gear wheel and the planet gear wheels are each connected only to one of the actuating lever, to the servo-motor and the throttle flap.

2. Adjusting device according to claim 1, wherein the outer gear wheel is connected to the actuating lever, the sun gear wheel to the servo-motor and the planet carrier to the throttle flap 3. Adjusting device according to claim 1, wherein the influencing and correcting variables acting on the servo-motor are the slip of the vehicle gear wheels, a driving speed or transmission ratio between the movements of the actuating lever and of the throttle flap, which ratio changes as a function of the position of the actuating lever and the selected gear of a vehicle transmission.

4. Adjusting device according to claim 2, wherein the influencing and correcting variables acting on the servo-motor are the slip of the vehicle gear wheels, a driving speed or transmission ratio between the movements of the actuating lever and of the throttle flap, which ratio changes as a function of the position of the actuating lever and the selected gear of a vehicle transmission.

5. Adjusting device according to claim 1, wherein the positions of the actuating lever, servo-motor and throttle flap are each determined by an actual-value transmitter, and in that the sum of the position values of the actuating lever and servo-motor is compared with the position value of the throttle flap in a computing unit.

6. Adjusting device according to claim 2, wherein the positions of the actuating lever, servo-motor and throttle flap are each determined by an actual-value transmitter, and in that the sum of the position values of the actuating lever and servo-motor is compared with the position value of the throttle flap in a computing unit.

7. Adjusting device according to claim 3, wherein the positions of the actuating lever, servo-motor and throttle flap are each determined by an actual-value transmitter, and in that the sum of the position values of the actuating lever and servo-motor is compared with the position value of the throttle flap in a computing unit.

8. Adjusting device according to claim 4, wherein the positions of the actuating lever, servo-motor and throttle flap are each determined by an actual-value transmitter, and in that the sum of the position values of the actuating lever and servo-motor is compared with the position value of the throttle flap in a computing unit.

9. Adjusting device according to claim 5, wherein during a fault in the mechanical transmission device between the actuating lever and that gear wheel of the planetary gear connected to this actuating lever, that gear wheel is brought into an end position corresponding to the idling position and is retained there by action of a restoring spring means; and
   wherein the position value determined by the actual-value transmitter of the actuating lever is transmitted to the servo-motor and the latter is adjusted according to this position value in addition to the other influencing and correcting variables.

10. Adjusting device according to claim 6, wherein during a fault in the mechanical transmission device between the actuating lever and that gear wheel of the planetary gear connected to this actuating lever, that gear wheel is brought into an end position corresponding to the idling position and is retained there by action of a restoring spring means; and
    wherein the position value determined by the actual-value transmitter of the actuating lever is transmitted to the servo-motor and the latter is adjusted according to this position value in addition to the other influencing and correcting variables.

11. Adjusting device according to claim 7, wherein during a fault in the mechanical transmission device between the actuating lever and that gear wheel of the planetary gear connected to this actuating lever, that gear wheel is brought into an end position corresponding to the idling position and is retained there by action of a restoring spring means; and
    wherein the position value determined by the actual-value transmitter of the actuating lever is transmitted to the servo-motor and the latter is adjusted according to this position value in addition to the other influencing and correcting variables.

12. Adjusting device according to claim 8, wherein during a fault in the mechanical transmission device between the actuating lever and that gear wheel of the planetary gear connected to this actuating lever, that gear wheel is brought into an end position corresponding to the idling position and is retained there by action of a restoring spring means; and
    wherein the position value determined by the actual-value transmitter of the actuating lever is transmitted to the servo-motor and the latter is adjusted according to this position value in addition to the other influencing and correcting variables.

13. Adjusting device according to claim 1, wherein the servo-motor in a currentless state, and consequently that gear wheel of the planetary gear connected to it, are both brought into an intermediate position and are retained there in response to the force of a spring means.

14. Adjusting device according to claim 2, wherein the servo-motor in a currentless state, and consequently that gear wheel of the planetary gear connected to it, are both brought into an intermediate position and are retained there in response to the force of a spring means.

15. Adjusting device according to claim 13 or 14, wherein the servo-motor is moved into the intermediate position by means of a rack which, when the servo-motor is currentless, is moved up against an adjustable stop as a result of a spring force.

16. Adjusting device according to claim 15 wherein the adjustable stop includes a stop rod which is retained in on end position by means of a magnet; and wherein, when the magnet becomes currentless at the same time as the servo-motor, the stop rod is shifted in the direction of the rack into a second end position as a result of a spring force.

17. Adjusting device according to claim 15, wherein the rack engages a sun gear shaft of the sun gear wheel.

18. Adjusting device according to claim 16, wherein the rack engages a sun gear shaft of the sun gear wheel.

19. Adjusting device according to claim 1, wherein that element of the planetary gear connected to the throttle flap is rotatingly connected to a drive gear wheel which drives a shaft of the throttle flap through an endless flexible drive toothed belt that connects the drive gear wheel to a driven wheel connected to the throttle flap.

20. Adjusting device according to claim 2, wherein that element of the planetary gear connected to the throttle flap is rotatingly connected to a drive gear wheel which drives a shaft of the throttle flap through an endless flexible drive toothed belt that connects the drive gear wheel to a driven wheel connected to the throttle flap.

* * * * *